United States Patent
Lin et al.

(10) Patent No.: US 7,568,061 B2
(45) Date of Patent: Jul. 28, 2009

(54) INITIALIZING EXPANSION ADAPTERS INSTALLED IN A COMPUTER SYSTEM HAVING SIMILAR EXPANSION ADAPTERS

(75) Inventors: Robert H. C. Lin, Raleigh, NC (US); Prasenjit Roy, Durham, NC (US); William B. Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 11/463,758

(22) Filed: Aug. 10, 2006

(65) Prior Publication Data

US 2008/0040525 A1 Feb. 14, 2008

(51) Int. Cl.
*G06F 13/00* (2006.01)

(52) U.S. Cl. .................... 710/301; 710/305; 713/2; 714/30

(58) Field of Classification Search ......... 710/301–306, 710/4; 714/30; 713/2
See application file for complete search history.

(56) References Cited

U.S. PATENT DOCUMENTS

| | | | |
|---|---|---|---|
| 5,619,701 A | 4/1997 | Neti | |
| 6,009,540 A * | 12/1999 | Craft et al. | 714/30 |
| 6,477,603 B1 | 11/2002 | Locker et al. | |
| 6,480,923 B1 | 11/2002 | Moertl et al. | |
| 6,567,911 B1 * | 5/2003 | Mahmoud | 713/2 |
| 6,744,603 B1 | 6/2004 | Soeno et al. | |
| 6,748,499 B2 | 6/2004 | Beukema et al. | |
| 2005/0038986 A1* | 2/2005 | Agan et al. | 713/2 |
| 2006/0069908 A1* | 3/2006 | Hanada et al. | 713/2 |

* cited by examiner

*Primary Examiner*—Clifford H Knoll
*Assistant Examiner*—Kim T Huynh
(74) *Attorney, Agent, or Firm*—Edward J. Lenart; Cynthia G. Seal; Biggers & Ohanian LLP.

(57) ABSTRACT

Methods, apparatus, and products are disclosed for initializing expansion adapters installed in a computer system having similar expansion adapters that include detecting an expansion adapter installed in a computer system having a plurality of expansion adapters, the detected expansion adapter having an option ROM containing initialization code, identifying similar expansion adapters installed in the computer system that correspond to the detected expansion adapter, each of the identified similar expansion adapters having an option ROM containing initialization code, disabling the option ROM of each of the identified similar expansion adapters, and initializing the plurality of expansion adapters installed in the computer system without executing the initialization code of the identified similar expansion adapters.

1 Claim, 5 Drawing Sheets

INITIALIZING EXPANSION ADAPTERS INSTALLED IN A COMPUTER SYSTEM HAVING SIMILAR EXPANSION ADAPTERS

BACKGROUND OF THE INVENTION

1. Field of the Invention

The field of the invention is data processing, or, more specifically, methods, apparatus, and products for initializing expansion adapters installed in a computer system having similar expansion adapters.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. Advances in semiconductor processing and computer architecture push the performance of the computer higher and higher.

Such advances in computer architecture have resulted in a computer system's ability to utilize other computer resources through expansion adapters containing option ROM. Expansion adapters containing option ROM are a valuable tool for expanding the functionality of computer systems. Including an option ROM with an expansion adapter allows an expansion card vendor to package initialization code and runtime code with the adapter. Packaging the initialization code and runtime code of an expansion adapter with an expansion adapter greatly simplifies the configuration of the expansion adapter because the expansion adapters are able to configure themselves rather than rely on system firmware.

Some computer architectures, such as the 32-bit x86 architecture developed by Intel, greatly limit the use of option ROM to promote backward compatibility earlier computer architectures. In those early computer architectures, total system computer memory was measured in kilobytes, and the size of a processor's address space was one megabyte. In today's computer architectures, computer memory is measured in gigabytes, and the size of a microprocessor's address space will soon be measured in terabytes. While total system memory and a processor's address space have increased by several orders of magnitude, the range of memory in a processor's memory address space devoted to option ROM has not increased at all. Just as in the early 1980's, the available size of the option ROM region in a processor's memory address space remains limited to a maximum of 256 kilobytes; however, on many of today's server and desktop computer architectures, only 128 kilobytes of this space is available for option ROM execution.

When computer architects first implemented option ROM, 256 kilobytes easily contained the option ROM initialization code of all adapters in the system. Since then, adapter functionality has become much more complex, and consequently, the address space required to address all the option ROMs in a computer system has also increased. For example, the option ROM of a single expansion bus adapter, such as a Small Computer System Interface ('SCSI') adapter, can take as much as 48 kilobytes to perform initialization of the adapter. That is, an expansion bus adapter may occupy up to 37.5% of the 128 kilobytes available in option ROM region of the address space on some platforms. In addition, computer systems often contain similar expansion adapters to enhance data processing efficiency, to provide failure recovery, or to provide failover capabilities. For example, many computer servers include two identical network adapters or multiple identical Redundant Array of Independent Disks ('RAID') controllers. Installing similar expansion adapters in a computer system results in the same computer code being mapped to multiple locations in the option ROM region of a processor's memory address space. Mapping multiple copies of the same computer code into the option ROM region of a processor's memory address space, however, often exceeds the 128 kilobyte limit and causes the computer system to fail during the boot sequence.

SUMMARY OF THE INVENTION

Methods, apparatus, and products are disclosed for initializing expansion adapters installed in a computer system having similar expansion adapters that include detecting an expansion adapter installed in a computer system having a plurality of expansion adapters, the detected expansion adapter having an option ROM containing initialization code, identifying similar expansion adapters installed in the computer system that correspond to the detected expansion adapter, each of the identified similar expansion adapters having an option ROM containing initialization code, disabling the option ROM of each of the identified similar expansion adapters, and initializing the plurality of expansion adapters installed in the computer system without executing the initialization code of the identified similar expansion adapters.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
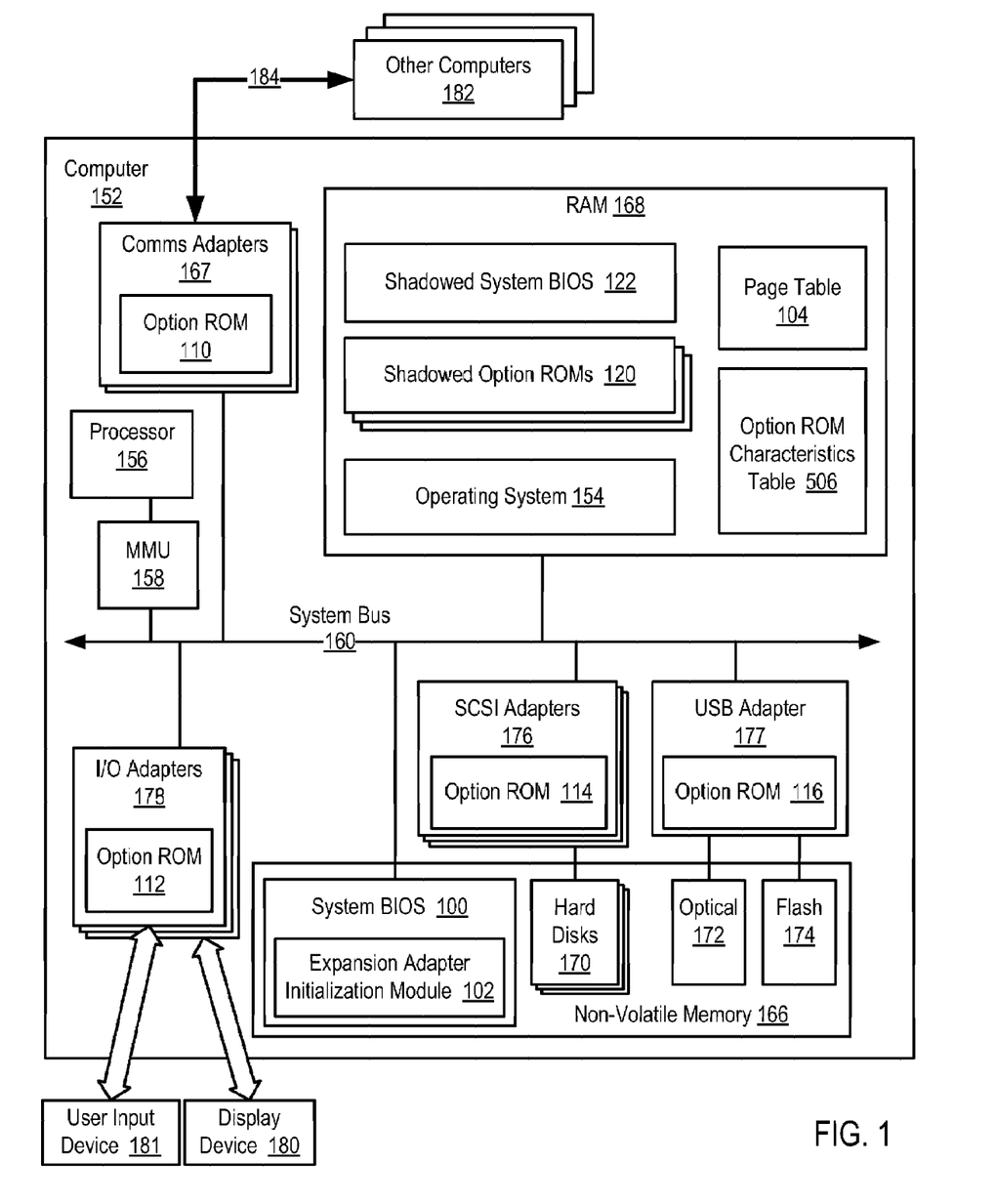
FIG. 1 sets forth a block diagram of automated computing machinery that includes an exemplary computer useful in initializing expansion adapters installed in a computer system having similar expansion adapters according to embodiments of the present invention.

Exemplary methods, apparatus, and products for initializing expansion adapters installed in a computer system having similar expansion adapters according to embodiments of the present invention are described with reference to the accompanying drawings, beginning with FIG. 1. Initializing expansion adapters installed in a computer system having similar expansion adapters in accordance with the present invention is generally implemented with computers, that is, with automated computing machinery. FIG. 1, therefore, sets forth a block diagram of automated computing machinery that includes an exemplary computer (152) useful in initializing expansion adapters installed in a computer system having similar expansion adapters according to embodiments of the present invention. The system of FIG. 1 operates generally for initializing expansion adapters installed in a computer system having similar expansion adapters according to embodiments of the present invention by detecting an expansion adapter installed in a computer system (152) having a plurality of expansion adapters (167, 176, 177), the detected expansion adapter having an option ROM containing initialization code, identifying similar expansion adapters installed in the computer system (152) that correspond to the detected expansion adapter, each of the identified similar expansion adapters having an option ROM containing initialization code, disabling the option ROM of each of the identified similar expansion adapters, and initializing the plurality of expansion adapters installed in the computer system.

An expansion adapter is computer hardware that expands the capabilities of a computer by providing the circuitry to support other devices. For example, video adapters enable the computer to support graphics monitors, and network adapters enable a computer to attach to a network. Expansion adapters may be built directly into the main circuitry of a computer, that is, into the 'motherboard,' but expansion adapters may also be built into separate circuit boards that insert into slots on the motherboard. Such separate circuit boards are referred to as 'expansion boards' or 'daughter cards.' Expansion adapters are typically implemented in accordance with the specification used to implement the computer bus that connects the expansion adapters to the other components of a computer system. Examples of specifications used to implement expansion adapters may include, for example the Peripheral Component Interconnect ('PCI') family of specifications, the Industry Standard Architecture ('ISA') specifications, the Extended Industry Standard Architecture ('EISA') specification, and any other specifications as will occur to those of skill in the art.

A 'similar expansion adapter' is an expansion adapter produced by the same manufacturer as another identical or similar expansion adapter installed in the computer system. A similar expansion adapter may be 'similar' to another expansion adapter installed in the computer system in that the option ROM of either adapter may be used to operate either adapter despite any differences between the two adapters.

The system of FIG. 1 includes a several computer hardware components operating as expansion adapters. The example computer (152) of FIG. 1 includes two similar communications adapters (167) connected to the other components of the computer (152) through system bus (160). The communications adapters (167) implement data communications (184) with other computers (182). Such data communications may be carried out serially through RS-232 connections, through external buses such as Universal Serial Bus ('USB'), through data communications networks such as Internet Protocol 'IP' networks, and in other ways as will occur to those of skill in the art. Communications adapters implement the hardware level of data communications through which one computer sends data communications to another computer, directly or through a network. Examples of communications adapters useful for initializing expansion adapters installed in a computer system having similar expansion adapters according to embodiments of the present invention include modems for wired dial-up communications, Ethernet (IEEE 802.3) adapters for wired network communications, and 802.11b adapters for wireless network communications.

The example computer (152) of FIG. 1 also includes similar Small Computer System Interface ('SCSI') adapters (176) connected to the other components of the computer (152) through system bus (160). SCSI is a standard bus protocol for transferring data between a variety of devices on both internal and external computer buses issued by the InterNational Committee for Information Technology Standards ('INCITS'). Several varieties of the SCSI standard exist such as, for example, SCSI-1, SCSI-2, SCSI-3, Ultra SCSI, Wide SCSI, and so on. The SCSI adapters (176) provide an interface for other components of computer (152) to utilize redundant SCSI hard disk drives (170).

The example computer (152) of FIG. 1 includes a USB adapter (177) connected to the other components of the computer (152) through system bus (160). USB is a serial bus standard for connecting devices on both internal and external computer buses developed by Hewlett-Packard, Intel, Lucent, Microsoft, NEC, and Philips. The USB adapter (177) provides an interface for other components of computer (152) to utilize optical disk drive (172) and electrically erasable programmable read-only memory space (so-called 'EEPROM' or 'Flash' memory) (174).

The example computer of FIG. 1 also includes one or more input/output interface adapters (178) connected to the other components of the computer (152) through system bus (160). The input/output interface adapters (178) in computers implement user-oriented input/output through, for example, software drivers and computer hardware for controlling output to display devices (180) such as computer display screens, as well as user input from user input devices (181) such as keyboards and mice.

Each expansion adapter (167, 176, 177, 178) in the system of FIG. 1 includes option ROM. An option ROM is firmware that provides an interface to implement operations specific to an expansion adapter such as, for example, a power-on self test ('POST'), initialization, interrupt service routines, and basic input/output ('BIOS') routines. Option ROM may contain several types of firmware such as, for example, initialization code and runtime code. Initialization code is the computer program instructions that initialize an expansion adapter and prepare the expansion adapter for runtime operation. Initialization code may operate by performing the POST of the expansion adapter and mapping the interrupt service routines to an interrupt vector table. Runtime code is computer program instructions that provide the interrupt service routines and BIOS routines after the expansion adapter and other components of the computer have been initialized. Although not all expansion adapters contain option ROM, an expansion adapter usually requires option ROM when system BIOS utilizes the expansion adapter before the operating system loads or when the expansion adapter operates in a manner too complex for system BIOS to control directly. In the example system of FIG. 1, the communications adapters (167) include option ROM (110), the SCSI adapters (176) includes option ROM (114), the USB adapter (177) includes option ROM (116), and the input/output adapters (178) include option ROM (112).

Although the acronym 'ROM' that is used in the term 'option ROM' stands for 'Read Only Memory,' option ROM is typically implemented using flash memory. The use of the acronym 'ROM' occurs for historical reasons because before 1990, computer designers typically implemented firmware using ROM chips that could not be altered. As the complexity of option ROM and the need to update option ROM grew, computer designers began to implement option ROM using flash memory devices so that firmware remained easily upgradeable. Although the hardware devices used to implement 'option ROM' has evolved, the term 'option ROM' itself remains.

The example computer (152) of FIG. 1 also includes a system BIOS (100). The system BIOS (100) is firmware that initializes and tests the hardware components of the computer as well as loads, executes, and passes control of computer hardware components over to an operating system. In addition, system BIOS remains in use after the operating system loads to provide the operating system low-level access to certain computer hardware devices. In the example of FIG. 1, the system BIOS (100) includes an expansion adapter initialization module (102). The expansion adapter initialization module (102) is a set of computer program instructions improved for initializing expansion adapters installed in a computer system having similar expansion adapters according to embodiments of the present invention. The expansion adapter initialization module (102) of FIG. 1 operates generally for initializing expansion adapters installed in a computer system having similar expansion adapters according to embodiments of the present invention by detecting an expansion adapter installed in a computer system (152) having a plurality of expansion adapters (167, 176, 177), the detected expansion adapter having an option ROM containing initialization code, identifying similar expansion adapters installed in the computer system (152) that correspond to the detected expansion adapter, each of the identified similar expansion adapters having an option ROM containing initialization code, disabling the option ROM of each of the identified similar expansion adapters, and initializing the plurality of expansion adapters installed in the computer system.

The computer (152) of FIG. 1 includes at least one computer processor (156), or 'CPU,' as well as random access memory (168) ('RAM'). Both the computer processor (156) and the RAM (168) connect to other components of the computer through a system bus (160). The processor (156) operates to execute the computer program instructions provided by other components of the exemplary computer (152). Stored in RAM (168) is a shadowed system BIOS (122) and shadowed option ROMs (120). The term 'shadowed' indicates that a copy of the object 'shadowed' exists in RAM. Shadowed system BIOS (122) therefore is a copy in RAM of system BIOS (100), and shadowed option ROMs (120) are copies in RAM of option ROMs (110, 112, 114, 116). The system BIOS (100) typically instructs processor (156) to copy the system BIOS (100) and option ROMs (110, 112, 114, 116) into RAM because RAM generally responds much faster than EEPROM implementing the system BIOS (100) and option ROMs (110, 112, 114, 116). Unless context indicates otherwise, the term 'option ROM' and 'shadowed option ROM' are used interchangeably in this specification. Also stored in RAM (168) is an operating system (154). Operating systems useful in computers according to embodiments of the present invention include UNIX™, Linux™, Microsoft XP™, IBM's AIX™, IBM's i5/OS™, and others as will occur to those of skill in the art.

The computer of FIG. 1 also includes an option ROM characteristics table (506) stored in RAM (168). The expansion adapter initialization module (102) stores in the option ROM characteristics table (324) the option ROM characteristics of an option ROM of an expansion adapter, including characteristics of an option ROM unavailable prior to execution of the initialization code. Option ROM characteristics are metrics that describe an option ROM. Option ROM characteristics may include, for example, initialization code size or runtime code size.

The example computer (152) of FIG. 1 also includes a page table (104) stored in RAM (168). The page table (104) represents a map between a virtual memory address space and a physical address space. The virtual memory address space is the range of computer memory addresses addressable by a computer processor. For example, a 16-bit processor has a virtual address space that extends from zero kilobytes ('KB') to 64 KB, while a 32-bit computer processor can have a virtual address space that extends from zero gigabytes ('GB') to 4 GB. The physical address space is the physical addresses of computer hardware components in the example of FIG. 1. The virtual memory address space is broken into fixed-size blocks called 'pages,' while the physical address space is broken into corresponding blocks of the same size called 'frames.' A predetermined number of the most significant bits in a memory address represent the page number of the memory address. The least significant bits represent the page offset of the memory address. When a processor references a memory address in the virtual memory address space, a memory management unit ('MMU') (158) looks up the frame number of the frame of physical addresses in the page table (104) that corresponds to the page of the memory addresses containing the referenced memory address. The MMU (158) then adds the page offset to the frame number to generate a physical address in the physical address space that corresponds to the memory address in the virtual memory address space. Because the page table (104) allows a processor to reference a memory address in the virtual memory address space without regard to its location in the physical address space, the MMU may map memory addresses in the virtual memory address space to any physical address of devices in the computer. The MMU may, for example, map RAM, ROM, option ROM, or registers of an expansion adapter into the virtual memory address space regardless of the physical addresses of these devices.

The example computer of FIG. 1 also includes an MMU (158). The MMU (158) is a set of computer hardware components responsible for managing memory access requests by the processor (156). The MMU (158) provides translation between the virtual memory address space and the physical address space using page (104). The page table used by MMU (158) may exist as software in RAM or be implemented in other forms of computer memory such as EEPROM or hardware registers. In addition to providing translation between the virtual memory address space and the physical memory address space, the MMU (158) may also provide memory protection, cache memory control, computer bus arbitration, and bank switching.

The shadowed system BIOS (122), the shadowed option ROMs (120), the option ROM characteristics table (324), the page table (104), and the operating system (154) in the example of FIG. 1 are shown in RAM (168), but many components of such software typically are stored in non-volatile memory (166) also. Computer (152) of FIG. 1 therefore includes non-volatile computer memory (166) coupled through expansion adapters (176, 177) or a system bus (160) to processor (156) and to other components of the computer (152). Non-volatile computer memory (166) may be implemented as a hard disk drive (170), optical disk drive (172), flash memory (174), RAM drives (not shown), or as any other kind of computer memory as will occur to those of skill in the art.

Readers will note that the computer architecture depicted in the exemplary computer (152) of FIG. 1 is for explanation and not for limitation. In fact, other computer architectures that include other components and other arrangements of components may be implemented in other computers useful for initializing expansion adapters installed in a computer system having similar expansion adapters according to embodiments of the present invention.

Figure 2:
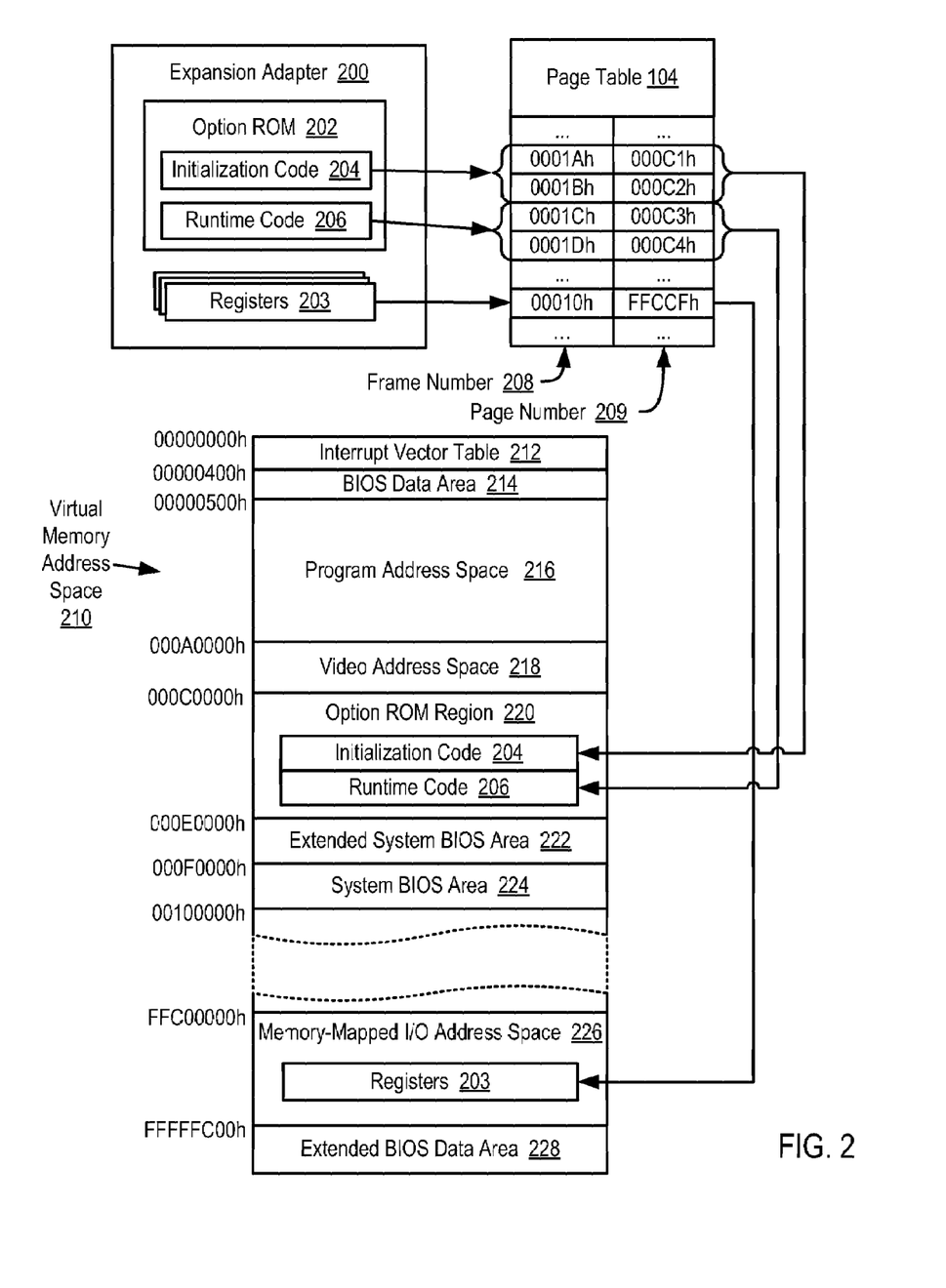
FIG. 2 sets forth a line drawing of an example virtual memory address space, an exemplary expansion adapter, and an exemplary page table useful in initializing expansion adapters installed in a computer system having similar expansion adapters according to embodiments of the present invention.

As explained above, a computer processor accesses computer devices through a virtual address space, and a memory management unit provides for the processor address translation between the virtual address space and the physical address space using a page table. For further explanation, therefore, FIG. 2 sets forth a line drawing of an example virtual memory address space (210), an exemplary expansion adapter (200), and an exemplary page table (104) useful in initializing expansion adapters installed in a computer system having similar expansion adapters according to embodiments of the present invention. In the example of FIG. 2, the virtual memory address space (210) is the range of addresses that are addressable by a computer processor. In the example of FIG. 2, the virtual memory address space extends from '00000000h' to 'FFFFFFFFh' indicating the ability of a 32-bit processor to address an address space up to 4 GB in size. Computer architects typically reserve certain addresses ranges within a virtual memory address space for particular uses.

In the example of FIG. 2, the address range from '00000000h' to '000003FFh' of the virtual memory address space (210) is reserved for an interrupt vector table (212). The interrupt vector table (212) is a range of memory addresses mapped into RAM that contains a table of address pointers to interrupt service routines. The interrupt vector table (212) consists of 256 4-byte pointers and resides in the first 1 KB of the virtual memory address space (210). Each interrupt number is reserved for a specific purpose. For example, 16 of the interrupt vectors are reserved for the 16 IRQ lines that exist in some computer architectures such as the 'x86' computer architecture developed by Intel.

In the example of FIG. 2, the address range from '00000400h' to '000004FFh' of the virtual memory address space (210) is reserved for a BIOS data area (214). The BIOS data area (214) is a 256 byte range of memory addresses mapped into RAM that are used by BIOS to manage system devices and resources. Information that may be stored in the BIOS data area (214) may include, for example, the number of serial and parallel ports installed, whether the caps lock of a keyboard is turned on, hard disk controller status, option ROM memory addresses, and so on.

In the example of FIG. 2, the address range from '00000500h' to '0009FFFFh' of the virtual memory address space (210) is reserved for a program address space (216). The program area (216) is a range of addresses mapped to RAM that an operating system uses to execute routines of the operating system itself or to run computer software applications.

In the example of FIG. 2, the address range from '000A0000h' to '000BFFFFh' of the virtual memory address space (210) is reserved for a video address space (218). The video address space (218) is a 128 KB block addresses mapped to an industry standard video device.

In the example of FIG. 2, the address range from '000C0000h' to '000DFFFFh' of the virtual memory address space (210) is reserved for an option ROM region (220). The option ROM region (220) is 128 KB block of virtual memory address space mapped to RAM or ROM that is typically used to access option ROMs of expansion adapters. A memory management unit maps addresses in the option ROM region to RAM or ROM depending on whether the system BIOS has shadowed the option ROM into RAM. Most often, the system BIOS copies the option ROMs into RAM and instructs the MMU to map the option ROM region (220) to RAM because access times to RAM are generally faster than access times to ROM. When option ROM is shadowed in RAM, the system BIOS assigns one of four read/write states to addresses in the option ROM region (220): read only, write only, read/write, or disabled. A memory management unit is responsible for enforcing these read/write states to protect the option ROM shadowed in RAM from alteration after an expansion adapter is initialized.

In the example of FIG. 2, the address range from '000E0000h' to '000EFFFFh' of the virtual memory address space (210) is the Extended System BIOS area (222) that is an extension of the System BIOS Area (224). The Extended System BIOS Area (222) is a 64 KB block in the virtual memory address space that is always mapped to RAM.

In the example of FIG. 2, the address range from '000F0000h' to '000FFFFFh' of the virtual memory address space (210) is reserved for a System BIOS Area (224). The System BIOS Area (224) is a 64 KB block of address that contains the system BIOS. By default, the System BIOS Area (224) maps to the EEPROM chip implementing the system BIOS. This default mapping enables a processor to locate the address '000FFFF0h' containing the location of the first instruction for execution when processor initially turns on. After the system BIOS copies itself into RAM, the system BIOS to remaps the System BIOS Area (224) into the RAM containing the shadowed system BIOS.

In the example of FIG. 2, the address range from 'FFC00000h' to 'FFFFFBFFh' of the virtual memory address space (210) is reserved for memory-mapped input/output ('I/O') address space (226). Memory-mapped I/O address space (226) is the range of addresses in the virtual memory space that are mapped to registers of peripheral devices. For example, in a memory mapped display, the virtual memory address space may be used for mapping extended video RAM on a high performance graphics adapter. Similarly, in a memory mapped network adapter, the registers for transmitting and receiving data are mapped to memory addresses in the virtual memory address space. Storing data in the memory address mapped to a register for transmitting data, sends the stored data through a data communications connection to another computer. Reading data in the memory address mapped to a register for receiving data obtains data sent through a data communications connection from another computer.

In the example of FIG. 2, the address range from 'FFFFFC00h' to 'FFFFFFFFh' of the virtual memory address space (210) is reserved for an extended BIOS data area (228). The extended BIOS data area (228) is the range of memory address in the virtual memory address space that maps to RAM.

The example of FIG. 2 also includes expansion adapter (200). The expansion adapter (200) is computer hardware that expands the capabilities of a computer by providing the circuitry to support other computer devices. Example expansion adapters include display adapters, network adapters, storage adapters, and so on. The expansion adapter (200) includes option ROM (202), which is firmware for implementing operations specific to expansion adapter (200). In the example of FIG. 2, the option ROM (202) includes initialization code (204) and runtime code (206). Initialization code (204) represents the computer program instructions that initialize an expansion adapter and prepare the expansion adapter for runtime operation. Initialization code (204) may operate to perform the POST of the expansion adapter and map the interrupt service routines to an interrupt vector table in RAM. Runtime code (206) is computer program instructions that provide the interrupt service routines and BIOS routines after the expansion adapter and other components of the computer have been initialized. In the example of FIG. 2, the expansion adapter (200) also includes registers (203). Registers (203) are hardware registers that store input data and output data for the expansion adapter (200).

The example of FIG. 2 includes a page table (104) that maps addresses between the virtual memory address space (210) and the physical address space. The page table (104) in the example of FIG. 2 associates a frame number (208) and a page number (209). Frame number (208) identifies a 4 KB block of address space in the physical address space. Page number (209) identifies a 4 KB block of address space in the virtual memory address space.

In the example of FIG. 2, the page table (104) maps the initialization code (204) and runtime code (206) of the option ROM (202) into the 128 KB option ROM region (220). Although the example of FIG. 2 depicts initialization code (204) and runtime code (206) of the option ROM (202) installed on the expansion adapter (200), such a depiction is for explanation and not limitation. Initialization code (204) and runtime code (206) of the option ROM (202) may also be shadowed in RAM (not shown). When the initialization code (204) and runtime code (206) are shadowed in RAM, the page table (104) maps addresses in the option ROM region (220) of FIG. 2 to physical addresses in RAM containing the shadowed initialization code and the shadowed runtime code.

In the example of FIG. 2, the page table (104) also maps registers (203) to the memory-mapped I/O address space (226). A processor therefore may access registers (203) of the expansion adapter (200) by reading and writing to memory addresses in the virtual memory address space that are mapped to registers (203). Although the example of FIG. 2 depicts registers (203) mapped to the memory-mapped I/O address space (226), such a depiction is for explanation and not for limitation. Registers (203) may also be mapped into a processor's I/O address space (not shown). Utilizing a processor's input/output address space is referred to as 'port-mapped I/O.' Port-mapped I/O uses a special class of processor instructions dedicated to performing I/O. Processors typically implement I/O address space by an extra I/O pin on the processors physical interface or an entire bus dedicated to I/O addresses.

Figure 3:
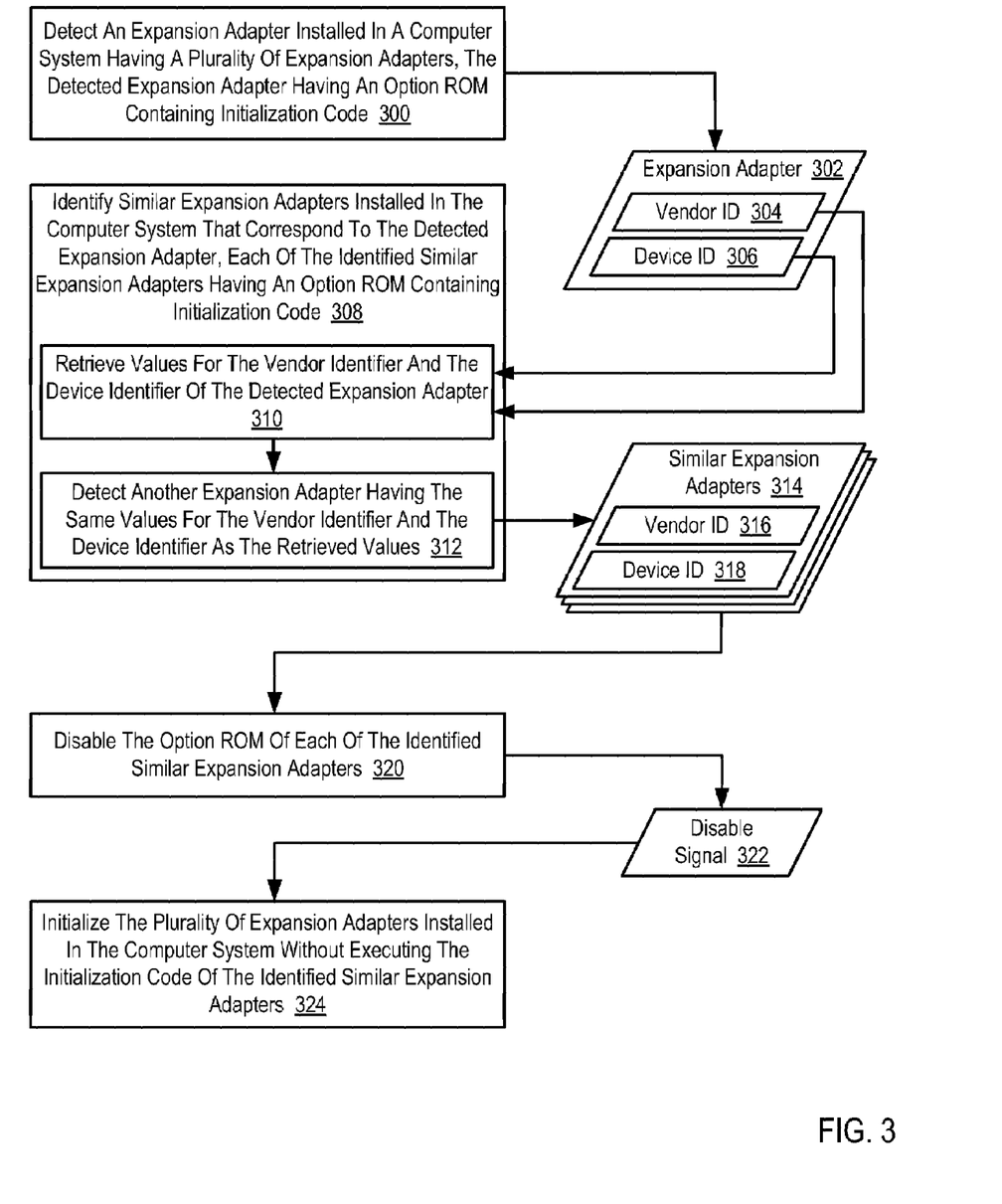
FIG. 3 sets forth a flow chart illustrating an exemplary method of initializing expansion adapters installed in a computer system having similar expansion adapters according to embodiments of the present invention.

Turning now to FIG. 3, FIG. 3 sets forth a flow chart illustrating an exemplary method of initializing expansion adapters installed in a computer system having similar expansion adapters according to embodiments of the present invention. The method of FIG. 3 includes detecting (300) an expansion adapter (302) installed in a computer system having a plurality of expansion adapters. Each of the plurality of expansion adapters includes a vendor identifier and a device identifier. The vendor identifier is a unique number describing the vendor of an expansion adapter. For example, Digital's PCI vendor identification is '0x1011' and Intel's PCI vendor identification is '0x8086.' The device identifier is a unique number describing the expansion adapter itself. For example, a Digital 21141 fast Ethernet device has a PCI device identification of '0x0009.' In the example of FIG. 3, the expansion adapter (302) represents an expansion adapter installed in a computer system having the plurality of expansion adapters installed within it. The expansion adapter (302) includes a vendor identifier (304) and a device identifier (306). The expansion adapter (302) of FIG. 3 also has an option ROM containing initialization code.

In the method of FIG. 3, detecting (300) an expansion adapter (302) installed in a computer system having a plurality of expansion adapters may be carried out by locating the option ROM header of an expansion adapter installed in the computer system. Locating the option ROM header of an expansion adapter installed in the computer system may be carried out by scanning the 'C0000h' to 'DFFFFh' address range of the virtual memory address space for a value of '55AAh' at every 2 KB boundary. '55AAh' is the signature of the option ROM header of an expansion adapter implemented according to PCI family of specifications.

The method of FIG. 3 also includes identifying (308) similar expansion adapters (314) installed in the computer system that correspond to the detected expansion adapter (302). Each of the identified similar expansion adapters (314) has an option ROM containing initialization code. The similar expansion adapters (314) of FIG. 3 represent expansion adapters that are identical or similar to the detected expansion adapter (302) installed in the computer system. In addition, the similar expansion adapters (314) of FIG. 3 are produced by the same manufacturer as the detected expansion adapter (302). In the method of FIG. 3, identifying (308) similar expansion adapters (314) installed in the computer system that correspond to the detected expansion adapter (302) includes retrieving (310) values for the vendor identifier (304) and the device identifier (306) of the detected expansion adapter (302) and detecting (312) another expansion adapter having the same values for the vendor identifier (316) and the device identifier (318) as the retrieved values.

Retrieving (310) values for the vendor identifier (304) and the device identifier (306) of the detected expansion adapter (302) according to the method of FIG. 3 may be carried out by reading the values stored in bits 0-15 and bits 16-31 respectively at '00h' offset in a PCI configuration header of an expansion adapter implemented according to the PCI family of specifications. The PCI configuration header of an expansion adapter implemented according to the PCI family of specifications may be accessed using WRITE_CONFIG_BYTE and READ_CONFIG_BYTE functions. WRITE_CONFIG_BYTE and READ_CONFIG_BYTE are functions described in the PCI BIOS Specification promulgated by the PCI-SIG® that respectively write to and read from registers in the PCI configuration header of a PCI expansion adapter.

Detecting (312) another expansion adapter having the same values for the vendor identifier (316) and the device identifier (318) as the retrieved values according to the method of FIG. 3 may be carried out by iteratively calling the FIND_PCI_DEVICE function described in the PCI BIOS Specification using the retrieved values of the vender identifier (304) and the device identifier (306) of the detected expansion adapter (302). Iteratively calling the FIND_PCI_DEVICE function using the retrieved values of the vender identifier (304) and the device identifier (306) of the detected expansion adapter (302) provides the bus number and device number of similar expansion adapters (314) installed in the computer system. A bus number is a number in the range '0 . . . 255' that uniquely selects a PCI bus. A device number is a number in the range '0 . . . 31' that uniquely selects a device on a PCI bus.

The method of FIG. 3 also includes disabling (320) the option ROM of each of the identified similar expansion adapters (314). Disabling (320) the option ROM of each of the identified similar expansion adapters (314) according to the method of FIG. 3 may be carried out by asserting a disable signal (322) to the identified similar expansion adapters (314). The disable signal (322) of FIG. 3 represents the data asserted to each identified similar expansion adapters (314) for disabling the option ROM of each of the identified similar expansion adapters (314). The disable signal (322) of FIG. 3 asserted to disable the option ROM of each of the identified similar expansion adapters (314) is specific to a particular expansion adapter bus standard. For example, in the PCI Bus Specification promulgated by the PCI-SIG®, the disable signal (322) may be implemented as a signal that writes a '0' in the least significant bit of the base address register at an offset of 30h bytes from the beginning of the PCI configuration header of the identified similar expansion adapters (314).

The method of FIG. 3 also includes initializing (324) the plurality of expansion adapters installed in the computer system without executing the initialization code of the identified similar expansion adapters (314). Initializing (324) the plurality of expansion adapters installed in the computer system without executing the initialization code of the identified similar expansion adapters (314) according to the method of FIG. 3 may be carried out by executing the initialization code of the detected expansion adapter and associating interrupts for each identified similar expansion adapter with runtime code of the detected expansion adapter as described below with reference to FIG. 4. Initializing (324) the plurality of expansion adapters installed in the computer system without executing the initialization code of the identified similar expansion adapters (314) according to the method of FIG. 3 may be carried out by identifying option ROM characteristics for each of the plurality of expansion adapters installed in the computer system, determining an adapter initialization order for each of the plurality of expansion adapters in dependence upon the option ROM characteristics, and initializing the plurality of expansion adapters in dependence upon the adapter initialization order for each of the plurality of expansion adapters as described below with reference to FIG. 5.

Figure 4:
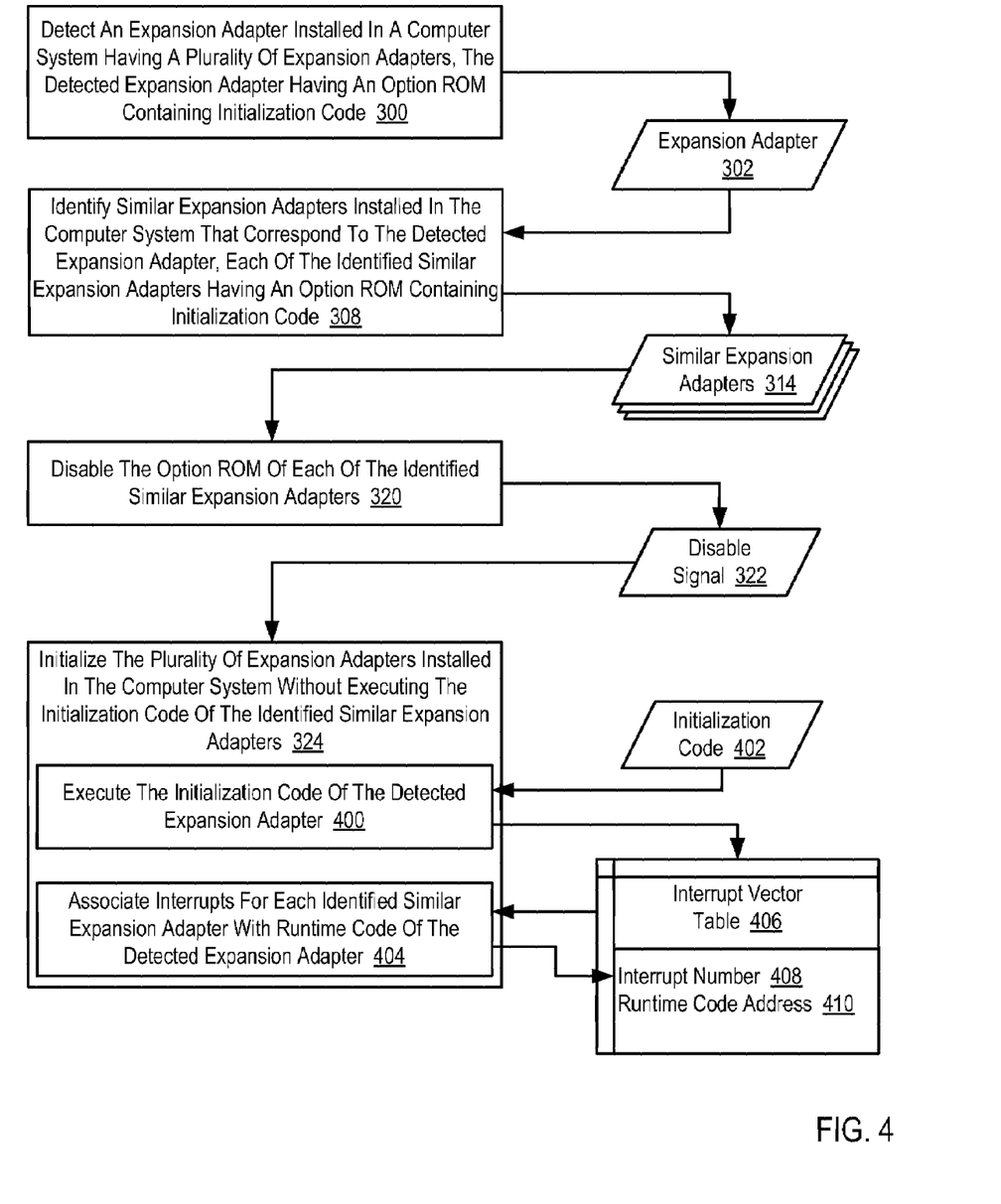
FIG. 4 sets forth a flow chart illustrating a further exemplary method of initializing expansion adapters installed in a computer system having similar expansion adapters according to embodiments of the present invention.

For further explanation, FIG. 4 sets forth a flow chart illustrating a further exemplary method of initializing expansion adapters installed in a computer system having similar expansion adapters according to embodiments of the present invention in which initializing (324) the plurality of expansion adapters installed in the computer system without executing the initialization code of the identified similar expansion adapters (314) is carried out by executing (400) the initialization code (402) of the detected expansion adapter (302), and associating (404) interrupts for each identified similar expansion adapter with runtime code of the detected expansion adapter. The initialization code (402) of FIG. 4 represents the initialization code contained in the option ROM of the detected expansion adapter (302).

In the method of FIG. 4, executing (400) the initialization code (402) of the detected expansion adapter (302) may be carried out by allocating virtual memory address space to the option ROM of the detected expansion adapter (302) and transferring processor execution to the first instruction for execution of the initialization code (402). Using an expansion adapter implemented according to the PCI Bus Specification, allocating virtual memory address space to the option ROM of the detected expansion adapter (302) may be carried out by querying a expansion adapter regarding the required address space by writing '1's in each bit of a base address register and then reading back the result from the same base address register.

A PCI expansion adapter will return '0's in several of the least significant bits of the base address register. The remaining most significant bits of the base address register specify the size of address space required. For example, after writing '11111111111111111111111111111111' to a base address register in a PCI configuration header, reading '11111111111111110000000000000000' from the same register indicates that the PCI expansion adapter requires 64 KB of memory address space. Transferring processor execution to the first instruction for execution of the initialization code (402) may be carried out by jumping to the location specified at the '3h' byte offset from the beginning of a PCI Expansion ROM header. The PCI Expansion ROM header is a data block of a PCI expansion adapter that allows a system BIOS to identify and execute a PCI option ROM.

Executing (400) the initialization code (402) of the detected expansion adapter (302) according to the method of FIG. 4 may also be carried out by associating interrupt numbers for the detected expansion adapter (302) with a runtime code address of the runtime code of the detected expansion adapter (302) in an interrupt vector table (406). The interrupt vector table (406) of FIG. 4 is a data structure that contains address pointers to interrupt service routines for handling interrupts received by a computer processor. The interrupt vector table (406) of FIG. 4 associates an interrupt number (408) with a runtime code address (410). The runtime code address (410) of FIG. 4 specifies an address pointer to runtime code implementing an interrupt service routine. The value of the runtime code address (410) for the detected expansion adapter (302) is specified at the '3h' byte offset from the beginning of a PCI Expansion ROM header. The interrupt number (408) of FIG. 4 identifies a particular interrupt that is receives by a computer processor. The interrupt number (408) of FIG. 4 may be implemented as a data field that stores a value identifying the interrupt or implemented as an offset from the beginning of the interrupt vector table (406).

In the method of FIG. 4, associating (404) interrupts for each identified similar expansion adapter (314) with runtime code of the detected expansion adapter may be carried out by storing the interrupt numbers for each identified similar expansion adapter (314) with the address (410) in the virtual memory space of the runtime code of the detected expansion adapter (302). By storing the interrupt numbers for each identified similar expansion adapter (314) with the address (410) in the virtual memory space of the runtime code of the detected expansion adapter (302), the processor will transfer execution to the runtime code of the detected expansion adapter (302) whenever an interrupt of the one of the identified similar expansion adapters (314) is triggered.

Readers will note that the other steps in the method of FIG. 4 are similar to the method of FIG. 3. Specifically, the method of FIG. 4 includes detecting (300) an expansion adapter (302) installed in a computer system having a plurality of expansion adapters, the detected expansion adapter having an option ROM containing initialization code, identifying (308) similar expansion adapters (314) installed in the computer system that correspond to the detected expansion adapter (302), each of the identified similar expansion adapters having an option ROM containing initialization code, disabling (320) the option ROM of each of the identified similar expansion adapters, and initializing (324) the plurality of expansion adapters installed in the computer system without executing the initialization code of the identified similar expansion adapters (314). The example of FIG. 4 is also similar to the example of FIG. 3 in that the example of FIG. 4 includes a detected expansion adapter (302), identified similar expansion adapters (314), and a disable signal (322).

As mentioned above, initializing the plurality of expansion adapters installed in the computer system without executing the initialization code of the identified similar expansion adapters may be carried out by initializing the plurality of expansion adapters in dependence upon the adapter initialization order for each of the plurality of expansion adapters. For further explanation, FIG. 5 sets forth a flow chart illustrating a further exemplary method of initializing expansion adapters installed in a computer system having similar expansion adapters according to embodiments of the present invention that includes initializing (504) the plurality of expansion adapters in dependence upon a adapter initialization order (514) for each of the plurality of expansion adapters.

Figure 5:
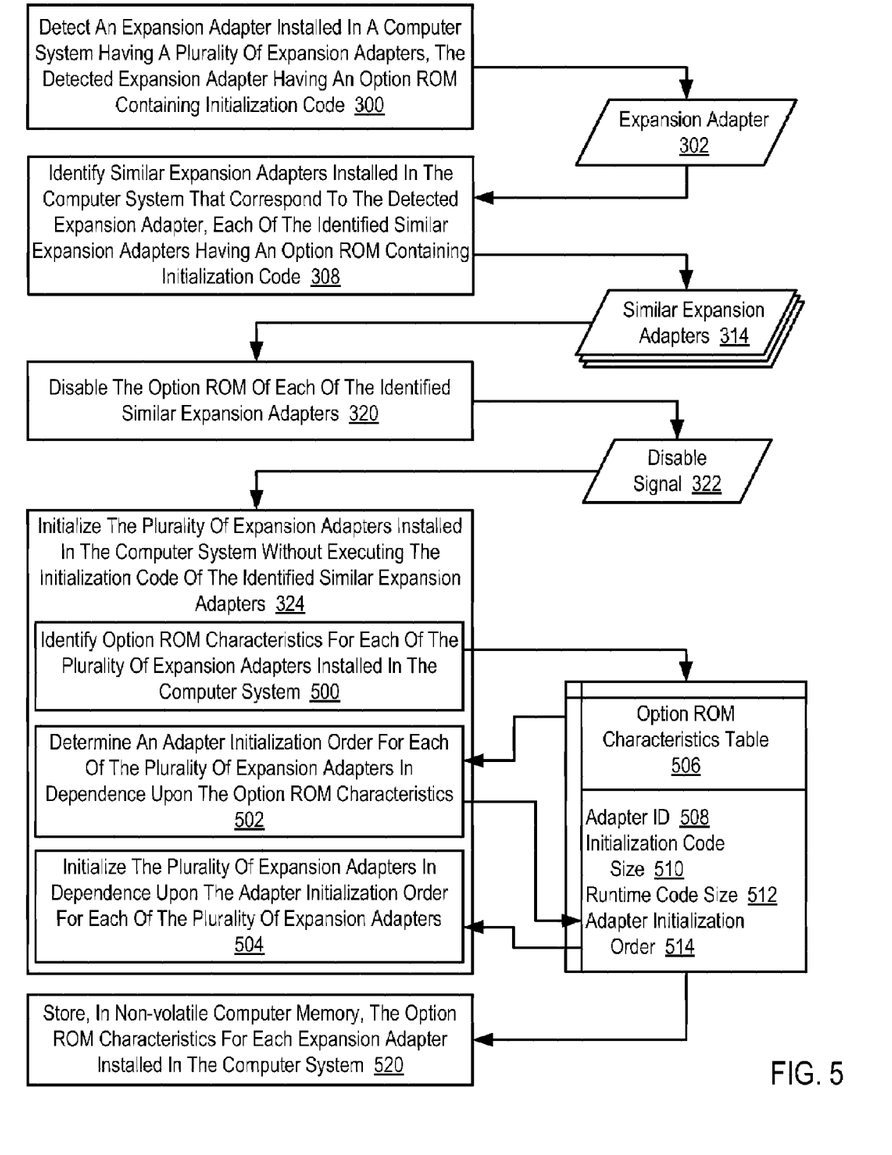
FIG. 5 sets forth a flow chart illustrating a further exemplary method of initializing expansion adapters installed in a computer system having similar expansion adapters according to embodiments of the present invention.

The method of FIG. 5 is similar to the method of FIG. 3. The method of FIG. 5 is similar to the method of FIG. 3 in that the method of FIG. 5 includes detecting (300) an expansion adapter (302) installed in a computer system having a plurality of expansion adapters, the detected expansion adapter having an option ROM containing initialization code, identifying (308) similar expansion adapters (314) installed in the computer system that correspond to the detected expansion adapter (302), each of the identified similar expansion adapters having an option ROM containing initialization code, disabling (320) the option ROM of each of the identified similar expansion adapters, and initializing (324) the plurality of expansion adapters installed in the computer system without executing the initialization code of the identified similar expansion adapters (314). The example of FIG. 5 is also similar to the example of FIG. 3 in that the example of FIG. 5 includes a detected expansion adapter (302), identified similar expansion adapters (314), and a disable signal (322).

The method of FIG. 5 differs from the method of FIG. 3 in that initializing (324) the plurality of expansion adapters installed in the computer system without executing the initialization code of the identified similar expansion adapters (314) according to the method of FIG. 5 includes identifying (500) option ROM characteristics for each of the plurality of expansion adapters installed in the computer system. Option ROM characteristics are metrics that describe an option ROM. Option ROM characteristics may include, for example, an initialization code size and a runtime code size for an option ROM of an expansion adapter. In the method of FIG. 5, identifying (500) option ROM characteristics for each of the plurality of expansion adapters installed in the computer system may be carried out by reading the size field contained in each option ROM. The location of the size field in an option ROM is specific to a particular expansion adapter bus standard. For example, in the PCI Bus Specification, the size field may be located in the initialization size field at a '2h' byte offset from the beginning of a PCI Expansion ROM header. Before a processor executes the initialization code of a PCI option ROM, the size field contains a value that represents the total size of the initialization code and the runtime code of an option ROM in units of 512 bytes. This total size is the initialization code size (510). During execution of the initialization code, however, the initialization code adjusts the value of the size field to indicate only the size of the runtime code. By reading the size field after a processor executes the initialization code, the runtime code size (512) of the option ROM may be obtained.

Identifying (500) option ROM characteristics for each of the plurality of expansion adapters installed in the computer system according to the method of FIG. 5 may also be carried out by storing the option ROM characteristics in an option ROM characteristics table (506). In the example of FIG. 5, each row of the option ROM characteristics table (506) represents the option ROM characteristics of an option ROM of a particular expansion adapter. The adapter identifier (508) specifies the particular expansion adapter installed in the computer system that contains an option ROM. The initialization code size (510) specifies the size of the virtual memory address space required to execute the initialization code of an expansion adapter. The runtime code size (512) specifies the size of the virtual memory address space required to execute the runtime code of an expansion adapter. The adapter initialization order (514) specifies the relative order in which the processor executes the initialization code of an expansion adapter during the boot sequence. A low value for the adapter initialization order (514) may, for example, indicate that a particular expansion adapter is initialized before other expansion adapters having a higher value for their adapter initialization order (514).

In the method of FIG. 5, initializing (324) the plurality of expansion adapters installed in the computer system without executing the initialization code of the identified similar expansion adapters (314) also includes determining (502) an adapter initialization order (514) for each of the plurality of expansion adapters in dependence upon the option ROM characteristics. Determining (502) an adapter initialization order (514) for each of the plurality of expansion adapters in dependence upon the option ROM characteristics may be carried out by assigning a 'NULL' value for the adapter initialization order (514) of the identified similar expansion adapters (314) because the identified similar expansion adapters (314) are initialized when the detected expansion adapter (302) is initialized. Assigning a 'NULL' value for the adapter initialization order (514) indicates that the processor does not execute the initialization code of an expansion adapter during the boot sequence.

Determining (502) an adapter initialization order (514) for each of the plurality of expansion adapters in dependence upon the option ROM characteristics may also be carried out by assigning values for the adapter initialization order (514) to the expansion adapters such that the expansion adapter with a value for the runtime code size (512) of '0' are initialized first. Such expansion adapters should be initialized first because the portion of the option ROM region in the virtual memory space that these expansion adapters utilized may be freed up for use by other expansion adapters after these expansion adapters are initialized.

Determining (502) an adapter initialization order (514) for each of the plurality of expansion adapters in dependence upon the option ROM characteristics may also be carried out by assigning values to the expansion adapters such that the expansion adapters having the largest values for the initialization code size are initialized before expansion adapters having smaller values for the initialization code size. Such an assignment permits the expansion adapters that require the largest portions of the option ROM region of the virtual memory address space to be initialized at points in the boot sequence when the most space in the option ROM region is available.

In the method of FIG. 5, initializing (324) the plurality of expansion adapters installed in the computer system without executing the initialization code of the identified similar expansion adapters (314) also includes initializing (504) the plurality of expansion adapters in dependence upon the adapter initialization order (514) for each of the plurality of expansion adapters. Initializing (504) the plurality of expansion adapters in dependence upon the adapter initialization order (514) for each of the plurality of expansion adapters according to the method of FIG. 5 may be carried out by executing the initialization code for the detected expansion adapter (302) and hooking the interrupts of the identified similar expansion adapters (314) to the runtime code of the detected expansion adapter as discussed above with reference to FIG. 4 at the point in the boot sequence specified by the value of the adapter initialization order (514) for the detected expansion adapter (302). Initializing (504) the plurality of expansion adapters in dependence upon the adapter initialization order (514) for each of the plurality of expansion adapters according to the method of FIG. 5 may also be carried out by executing the initialization code for each of the other expansion adapters at the point in the boot sequence specified by the value of the adapter initialization order (514) for each of the other expansion adapters installed in the computer system.

As mentioned above, some of the option ROM characteristics, such as, for example, runtime code size, cannot be identified until an expansion adapter has been initialized. Because such option ROM characteristics are used to determine an adapter initialization order (502) and the adapter initialization order (502) is determined before the expansion adapters are initialized during the boot sequence, option ROM characteristics such as runtime code size cannot be used to determine an adapter initialization order (514) unless those option ROM characteristics were stored in non-volatile computer memory during a previous boot sequence. The method of FIG. 5, therefore, also includes storing (520), in non-volatile computer memory, the option ROM characteristics for each expansion adapter installed in the computer system. Storing (520), in non-volatile computer memory, the option ROM characteristics for each expansion adapter installed in the computer system according to the method of FIG. 5 may be carried out by allocating an unused storage location in non-volatile memory such as, for example, non-volatile BIOS memory, and storing the option ROM characteristics in the unused storage location. Allocating an unused storage location in non-volatile memory may be carried out using a system specific call into non-volatile computer memory. By storing (520) the option ROM characteristics for each expansion adapter in non-volatile computer memory, identifying (500) the option ROM characteristics for each of the plurality of expansion adapters installed in the computer system according to the method of FIG. 5 may also, therefore, be carried out by retrieving the option ROM characteristics from non-volatile memory.

Readers will note that various examples, explanations, and descriptions of initializing expansion adapters installed in a computer system having similar expansion adapters according to embodiments of the present invention reference the PCI family of specifications. Such references, however, are for explanation only and not for limitation. Initializing expansion adapters installed in a computer system having similar expansion adapters according to embodiments may also be carried out using computer buses and devices implemented according to other families of computer bus specifications as will occur to those of skill of the art. Such specifications may, for example, include the ISA specifications, the EISA specifications, the Video Electronics Standards Association Local Bus ('VLB') specifications, the Micro Channel Architecture ('MCA') specifications, the Accelerated Graphics Port ('AGP') specifications, and so on.

Exemplary embodiments of the present invention are described largely in the context of a fully functional computer system for initializing expansion adapters installed in a computer system having similar expansion adapters. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of initializing expansion adapters installed in a computer system having similar expansion adapters, the method comprising:

detecting an expansion adapter installed in a computer system having a plurality of expansion adapters, the detected expansion adapter having an option ROM containing initialization code, and each of the plurality of expansion adapters having a vendor identifier and a device identifier;

identifying similar expansion adapters installed in the computer system that correspond to the detected expansion adapter, wherein the similar expansion adapter is produced by the same manufacturer as the detected expansion adapter, each of the identified similar expansion adapters having an option ROM containing initialization code, further comprising:

retrieving values for the vendor identifier and the device identifier of the detected expansion adapter; and detecting another expansion adapter having the same values for the vendor identifier and the device identifier as the retrieved values;

disabling the option ROM of each of the identified similar expansion adapters; and initializing the plurality of expansion adapters installed in the computer system without executing the initialization code of the identified similar expansion adapters, further comprising:

identifying option ROM characteristics for each of the plurality of expansion adapters installed in the computer system, wherein the option ROM characteristics further comprise an initialization code size and a runtime code size for an option ROM of an expansion adapter;

determining an adapter initialization order for each of the plurality of expansion adapters in dependence upon the option ROM characteristics;

initializing the plurality of expansion adapters in dependence upon the adapter initialization order for each of the plurality of expansion adapters; and storing, in non-volatile computer memory, the option ROM characteristics for each expansion adapter installed in the computer system.

\* \* \* \* \*